United States Patent
Wepfer

(10) Patent No.: US 8,681,922 B2
(45) Date of Patent: Mar. 25, 2014

(54) PRESSURIZER WITH A MECHANICALLY ATTACHED SURGE NOZZLE THERMAL SLEEVE

(75) Inventor: Robert M. Wepfer, Export, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 647 days.

(21) Appl. No.: 12/967,167

(22) Filed: Dec. 14, 2010

(65) Prior Publication Data

US 2011/0170650 A1    Jul. 14, 2011

Related U.S. Application Data

(60) Provisional application No. 61/294,514, filed on Jan. 13, 2010.

(51) Int. Cl.
*G21C 9/00*    (2006.01)
*F16L 1/00*    (2006.01)

(52) U.S. Cl.
CPC ........................................ *F16L 1/00* (2013.01)
USPC .......................................................... 376/283

(58) Field of Classification Search
CPC ............................................................ F16L 1/00
USPC .......................................................... 376/283
See application file for complete search history.

(56) References Cited

U.S. PATENT DOCUMENTS

| | | | |
|---|---|---|---|
| 3,305,452 A * | 2/1967 | Remoleur | 376/277 |
| 3,999,278 A * | 12/1976 | Loskill | 29/450 |
| 4,255,840 A | 3/1981 | Loch | |
| 4,840,096 A * | 6/1989 | Martin et al. | 82/113 |
| 5,183,625 A | 2/1993 | Batistoni | |
| 5,918,911 A * | 7/1999 | Sims | 285/13 |
| 6,358,000 B1 * | 3/2002 | Veronesi et al. | 415/134 |
| 2008/0110229 A1 * | 5/2008 | Badlani et al. | 72/367.1 |

OTHER PUBLICATIONS

Champomier, PCSR, Sub-chapter 5.4, Components and Systems Sizing, UKEPR-)))@-054 Issue 02 (online) Jun. 29, 2009, retrieved from the internet http://lwww.epr-reactor.co.uklssmodlliblocal/docsIPCSR/Chapter%20%205%20-%20Reactor%20Coolant%20System%20and%20Associated%20Systems/Sub-Chapter%205.4%20-%20Components%20and%20Systems%20S z ng.pdf> pp. 1, 61, 91.*
Champomier, "PCSR—Sub-chapter 5.4, Components and Systms Sizing", UKEPR-0002-054 Issue 02, Jun. 29, 2009.*

* cited by examiner

*Primary Examiner* — Frank J McGue
(74) *Attorney, Agent, or Firm* — Richard J. Coldren; Westinghouse Electric Company LLC

(57) ABSTRACT

A thermal sleeve is mechanically attached to the bore of a surge nozzle of a pressurizer for the primary circuit of a pressurized water reactor steam generating system. The thermal sleeve is attached with a series of keys and slots which maintain the thermal sleeve centered in the nozzle while permitting thermal growth and restricting flow between the sleeve and the interior wall of the nozzle.

14 Claims, 4 Drawing Sheets

PRESSURIZER WITH A MECHANICALLY ATTACHED SURGE NOZZLE THERMAL SLEEVE

CROSS REFERENCE TO RELATED APPLICATION

This application is related to Provisional Patent Application Ser. No. 61/294,514, filed Jan. 13, 2010 and claims priority thereto.

GOVERNMENT INTEREST

This invention was made with Government support under Contract No. DE-FC07-07ID14779 awarded by the Department of Energy. The Government has certain rights in the invention.

BACKGROUND OF THE INVENTION

1. Field of the Invention

This invention pertains in general to pressurizers for pressurized water nuclear reactor power generating systems and more particularly to the thermal liners attached to the interior of the surge nozzles for such pressurizers.

2. Related Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16 completing the primary loop. Typically, a plurality of the above-described loops are connected to a single reactor vessel 10 by reactor coolant piping 20. The primary side is maintained at a high pressure in the order of 155 bars by means of a pressurizer 22 that is connected to one of the loops of the primary side.

The pressurizer makes it possible to keep the pressure in the primary circuit between predetermined limits either by spraying the primary coolant fluid when the pressure tends to exceed the permissible upper limit or by electrical heating of the primary fluid when the pressure tends to fall below the permissible lower limit. These operations are carried out inside the pressurizer which comprises a generally cylindrical casing arranged with its axis vertical and having its lower and upper parts closed by means of domed ends. The lower domed end has sleeves passing through it in which electrical heaters are introduced into the pressurizer. The lower domed end also has a combined inlet and outlet surge nozzle that communicates directly with the primary loop piping 20 to maintain the pressure within the primary circuit within design limits.

As can be appreciated from FIGS. 2, 3 and 5, the surge nozzles 24 of the pressurizers 22 include thermal sleeves or liners 26 to reduce the effect of thermal transients on the fatigue of the nozzles. These thermal sleeves have typically been welded to or explosively expanded into the nozzle 24. FIG. 2 shows the thermal sleeve 26 welded at one axial location 28 along the interior of the nozzle. A spacer 29 is positioned between the thermal sleeve 26 and the nozzle 24, proximate an inner end to minimize vibration of the sleeve, to keep the sleeve centered in the nozzle during welding, and to maintain a radial gap between the nozzle and the sleeve as a thermal barrier. FIG. 3 shows the thermal sleeve 26 explosively expanded at the expansion zone 30, into the interior surface of the surge nozzle 24. Both of these installation techniques have drawbacks. Welding the thermal sleeve to the nozzle occurs only over a portion of the circumference, since welding over the entire circumference would result in unacceptable stresses in the thermal sleeve during certain transients. This results in non-uniform by-pass behind the thermal sleeve and bending in the nozzle. More particularly, the welding occurs on the interior of the nozzle typically over a 45° arc length. During cold water in-surge transients, the thermal sleeve contracts relative to the nozzle, and the asymmetric welding pattern results in a gap between the thermal sleeve and nozzle opposite the weld. Explosive expansion can also result in non-uniform expansion, and residual stresses in the sleeve material. The thermal sleeve is tightly fit to a groove machined into the cladding. There is no feature to center the thermal sleeve in the nozzle so contraction of the thermal sleeve during cold in-surge transients will result in non-uniform radial gaps, and hence additional thermal and bending stresses in the nozzle. In addition, explosive expansion is not always a well controlled process, and requires special permitting and handling which creates difficulties for the manufacturers.

Accordingly, an improved means for attaching the thermal sleeve to the nozzle is desired that will keep the thermal sleeve centered in the nozzle and not create non-uniform gaps between the sleeve and the interior of the nozzle.

SUMMARY OF THE INVENTION

These and other objects are achieved by this invention which provides a pressure vessel, and more particularly a pressurizer pressure vessel having a surge nozzle with a thermal sleeve mechanically attached to the interior thereof. The surge nozzle has an axial dimension and a first opening adjacent an interior of the pressure vessel at one end of the axial dimension and a second opening adjacent an exterior of the pressure vessel at a second end of the axial dimension. The thermal sleeve lines at least a portion of the interior of the surge nozzle along the axial dimension with a first end of the thermal sleeve proximate the first opening and a second end of the thermal sleeve proximate the second opening. A plurality of mechanical couplings connect the interior of the surge nozzle and thermal sleeve proximate the first end and the first opening and supports the thermal sleeve in the axial direction, with the first plurality of mechanical couplings being circumferentially spaced around the interior of the surge nozzle. A second plurality of mechanical couplings connect the interior of the surge nozzle and the thermal sleeve proximate the second end and the second opening and secures the thermal sleeve from rotation, with at least some of the second plurality of mechanical couplings circumferentially spaced around the interior of the surge nozzle. Preferably, each of the first plurality of mechanical couplings and the second plurality of mechanical couplings are equally spaced circumferentially around the thermal sleeve.

In one embodiment, each of the first plurality of mechanical couplings are substantially at a first axial location and each of the second plurality of mechanical couplings are substantially at a second axial location. In the one embodiment, the first plurality of mechanical couplings are a key and slot coupling wherein the keys extend through a slotted opening in the thermal sleeve and into a groove formed in the interior of the surge nozzle. Preferably, the keys and slots are elongated and extend in the circumferential direction. Desirably, a head of the key is larger than the slot in the thermal sleeve through which the key extends and the head of the key is mated to and welded to an interior surface of the thermal sleeve and a portion of the key that fits within the slot on the interior of the surge nozzle is welded to the thermal sleeve.

In another embodiment, the second plurality of mechanical couplings are key and slot couplings wherein the slots are formed in the second end of the thermal sleeve and the keys protrude radially inward from the interior of the surge nozzle. Desirably, the slots in the second plurality of mechanical couplings are open ended and are elongated and extend in the axial direction.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 4:
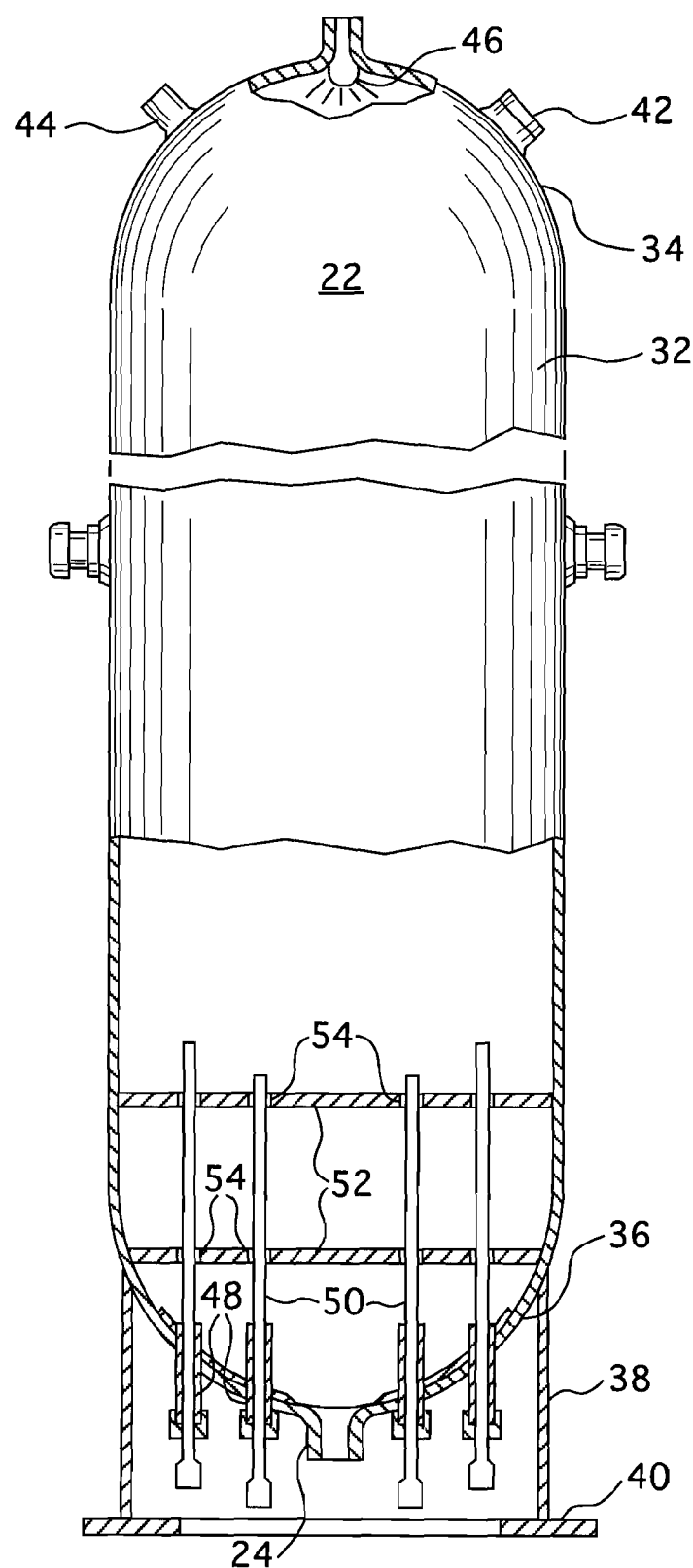
FIG. 4 is a partial sectional view of a pressurizer.

Referring to FIG. 4, there is shown a pressurizer 22 for a pressurized water nuclear power plant system. The pressurizer 22 comprises a pressure vessel having a vertically oriented cylindrical shell 32, a first or upper hemispherical head portion 34 and a second or lower hemispherical head portion 36. A cylindrical skirt 38 extends downwardly from the lower head portion 36 and has a flange 40 fastened thereto by welding or other means to form a support structure for the vessel. The upper head portion 34 has a manhole or man-way 42 for servicing the interior of the vessel, one or more nozzles 44, respectively, in fluid communication with a safety valve (not shown) and a spray nozzle 46 disposed therein. The spray nozzle 46 is in fluid communication with a supply of relatively cool primary fluid and has means associated therewith (not shown), which controls the flow of the relatively cool fluid to the pressurizer.

A plurality of nozzles 48 are vertically disposed in the lower head 36 and a plurality of straight tubular electrical immersion heating elements 50 extend through the nozzles 48 and into the pressurizer 22. The heating elements 50 have a metal sheath covering the outer surface thereof and seal welds are formed between the metal sheaths and the nozzles 48. To support the heating elements in the pressurizer, a single or a plurality of support plates 52 are disposed transversely in the lower portion thereof. The support plate(s) 52 have a plurality of holes 54 which receive the heating elements 50.

A combined inlet and outlet nozzle 24, commonly referred to as a surge nozzle is centrally disposed in the lower head 36 and places the pressurizer in fluid communication with the primary fluid system of the pressurized water nuclear reactor power plant.

Figure 1:
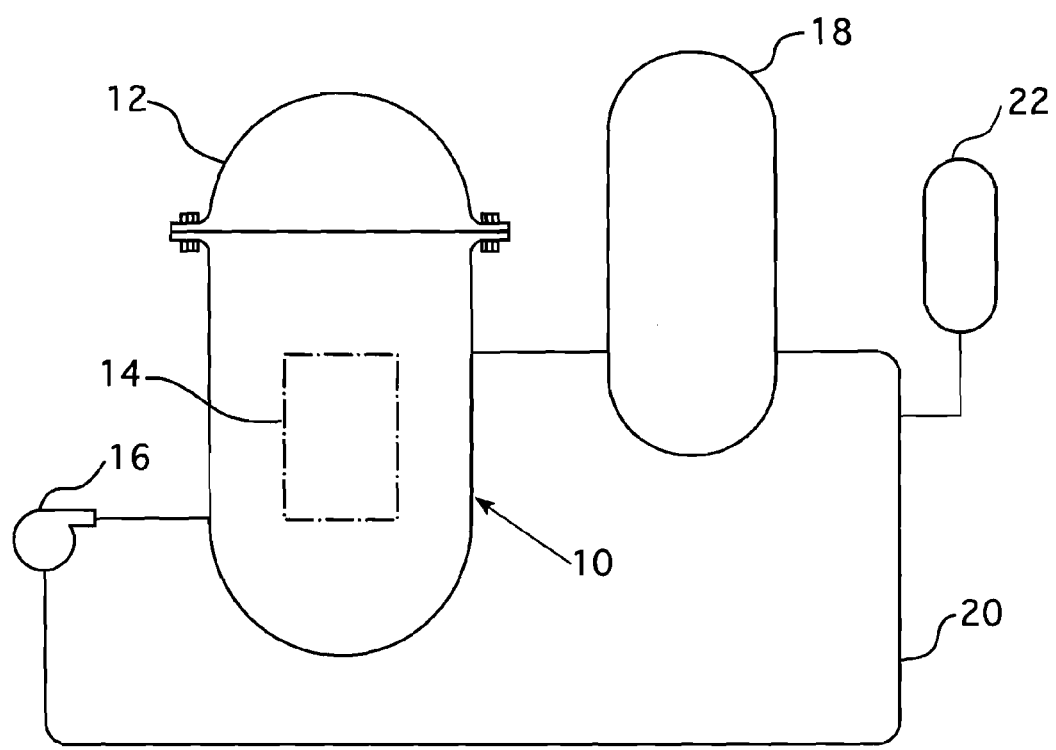
FIG. 1 is a simplified schematic of a nuclear reactor system to which this invention can be applied.
Figure 2:
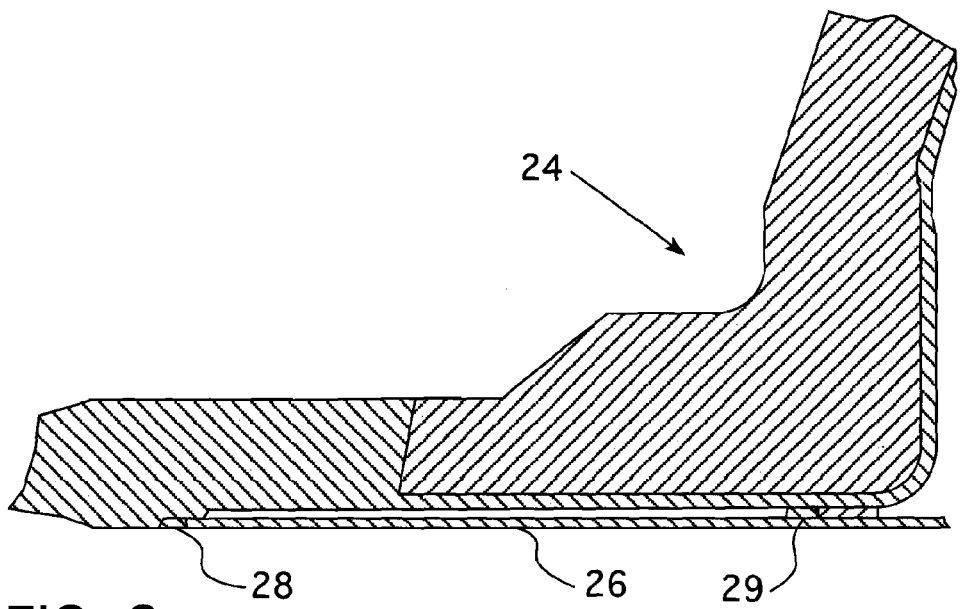
FIG. 2 is a sectional view of a portion of a surge nozzle with a welded thermal sleeve.
Figure 3:
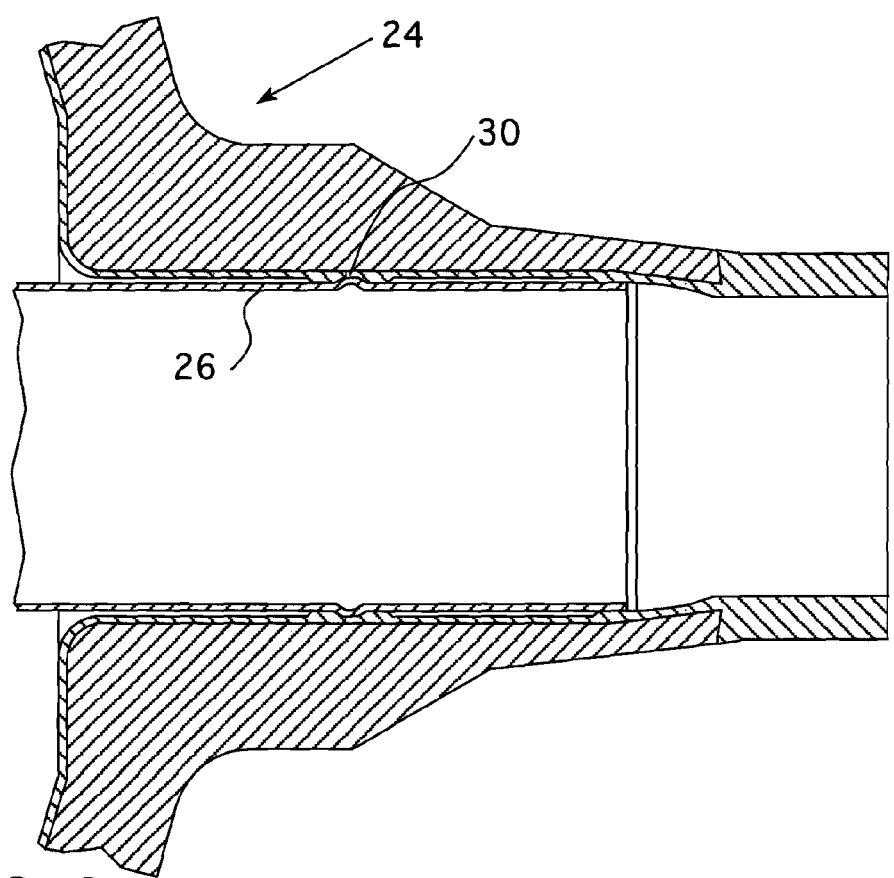
FIG. 3 is a sectional view of a surge nozzle with an explosively expanded thermal sleeve.

As previously mentioned, the surge nozzles of pressurizers include the thermal sleeves or liners previously discussed with regard to FIGS. 2 and 3, which are employed to reduce the effect of thermal transients on the fatigue of the nozzle. In accordance with this invention, the thermal sleeve is attached to the bore of nozzle by means of a mechanical attachment. The attachment means of this invention allows for the sleeve to fully expand in the longitudinal direction as well as radially, which is necessary to address thermal transients experienced by the surge nozzle. The sleeve attachment is accomplished by the inclusion of annular grooves in the nozzle bore, which receive supporting keys to provide axial support for the sleeve. To prevent rotational movement, slots are provided in the lower end of the sleeve which receive keys machined in the bore of the nozzle 24.

Figure 5:
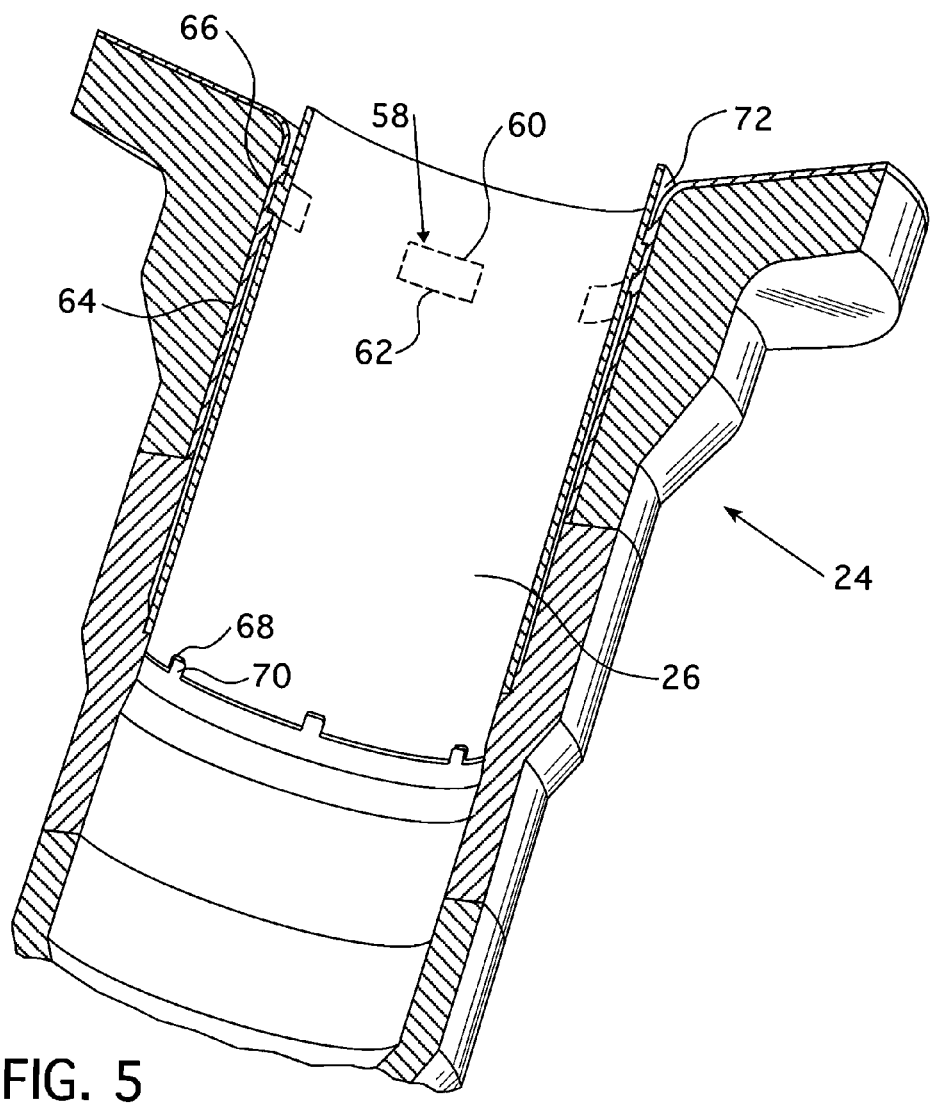
FIG. 5 is a sectional view of a surge nozzle with a mechanically attached thermal sleeve in accordance with this invention.

FIG. 5 illustrates a sectional view of surge nozzle 24 having a thermal sleeve 26 lining the interior surface thereof, which is attached to the nozzle in accordance with this invention. The thermal sleeve 26 is supported at the top end of the nozzle 24 by radial keys 58. The radial keys fit through openings 60 in the thermal sleeve 26, and are welded around their perimeter 62 on the bore of the thermal sleeve 26. Preferably, on one side the radial keys 58 have enlarged heads that are captured by the inner surface of the thermal sleeve around the opening 60 and at the other end are received into an annular groove 66 machined in the cladding 64 that lines the surface of a nozzle 24.

The lower end of the thermal sleeve includes axially extending slots 68. Small keys 70, machined in the bore of the nozzle 24, are received in the slots 68, to maintain centering of the thermal sleeve lower end during transient conditions.

Flow in the crevice region 72 behind the thermal sleeve 26 is restricted by small clearances between the sleeve and the nozzle bore at both the upper end raised cladding surface and at the lower end. Thus, an improved thermal sleeve attachment to the interior surface of the nozzle is provided that can accommodate thermal growth without adding substantial stress to the nozzle.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pressurizer for a pressurized water nuclear reactor comprising:
   a pressure vessel including
   a surge nozzle having an axial dimension and a first opening adjacent an interior of the pressure vessel at one end of the axial dimension and a second opening adjacent an exterior of the pressure vessel at a second end of the axial dimension;
   a thermal sleeve lining at least a portion of an interior wall of the surge nozzle along the axial dimension, the thermal sleeve having a first end proximate the first opening and a second end proximate the second opening;

a first plurality of mechanical couplings between the interior wall of the surge nozzle and the thermal sleeve proximate one of either the first end or the second end wherein at least some of the first plurality of mechanical couplings are circumferentially spaced around the interior of the surge nozzle;

a second plurality of mechanical couplings between the interior of the surge nozzle and the thermal sleeve proximate the other of the first end or second end wherein at least some of the second plurality of mechanical couplings are circumferentially spaced around the interior of the surge nozzle; and wherein one of either the first plurality of mechanical couplings or the second plurality of mechanical couplings are structured to restrain the thermal sleeve from axial movement while permitting circumferential movement and the other of the first plurality of mechanical couplings or the second plurality of mechanical couplings are structured to restrain circumferential movement while permitting axial growth.

2. The pressurizer of claim 1 wherein substantially each of the first plurality of mechanical couplings are equally spaced circumferentially around the thermal sleeve.

3. The pressurizer of claim 2 wherein each of the first plurality of mechanical couplings are at substantially the same axial location.

4. The pressurizer of claim 1 wherein substantially each of the second plurality of mechanical couplings are equally spaced circumferentially around the thermal sleeve.

5. The pressurizer of claim 4 wherein each of the second plurality of mechanical couplings are at substantially the same axial location.

6. The pressurizer of claim 1 wherein the first plurality of mechanical couplings are key and slot couplings wherein the key extends radially through the slot.

7. The pressurizer of claim 6 wherein the key extends through a slot in the thermal sleeve and into a groove formed on the interior of the surge nozzle.

8. The pressurizer of claim 6 wherein the keys and slots extend, elongated, in the circumferential direction.

9. The pressurizer of claim 7 wherein a head of the key is larger than the slot in the thermal sleeve through which it extends and is mated to and welded to an interior surface of the thermal sleeve and a radial end of the key fits within the groove on the interior of the surge nozzle.

10. The pressurizer of claim 1 wherein the second plurality of mechanical couplings are key and slot couplings wherein the slots are formed in the second end of the thermal sleeve and the keys protrude radially inward from the interior of the surge nozzle through the slot.

11. The pressurizer of claim 10 wherein the slots in the thermal sleeve are open ended.

12. The pressurizer of claim 10 wherein the slots are elongated and extend in the axial direction.

13. The pressurizer of claim 10 wherein the keys have a head that fits into the slots.

14. A pressure vessel for a nuclear steam supply system comprising:

a nozzle having an axial dimension and a first opening adjacent an interior of the pressure vessel at one end of the axial dimension and a second opening adjacent an exterior of the pressure vessel at a second end of the axial dimension;

a thermal sleeve lining at least a portion of an interior of the surge nozzle along the axial dimension, the thermal sleeve having a first end proximate the first opening and a second end proximate the second opening;

a first mechanical coupling between the interior of the nozzle and the thermal sleeve proximate the first end and the first opening;

a second mechanical coupling between the interior of the nozzle and the thermal sleeve proximate the second end and the second opening; and wherein one of either the first mechanical coupling or the second of mechanical coupling is structured to restrain the thermal sleeve from axial movement while permitting circumferential movement and the other of the first mechanical coupling or the second mechanical coupling is structured to restrain circumferential movement while permitting axial growth.

* * * * *